United States Patent
Nagurny et al.

(10) Patent No.: US 8,776,538 B2
(45) Date of Patent: Jul. 15, 2014

(54) HEAT-EXCHANGE APPARATUS WITH PONTOON-BASED FLUID DISTRIBUTION SYSTEM

(75) Inventors: Nicholas J. Nagurny, Manassas, VA (US); Eugene C. Jansen, Dumfries, VA (US); Natalie B. Levings, North Richland Hills, TX (US); Stephen L. Bailey, Los Gatos, CA (US); Robert J. Howard, Walkersville, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 282 days.

(21) Appl. No.: 13/250,446

(22) Filed: Sep. 30, 2011

(65) Prior Publication Data

US 2012/0080164 A1 Apr. 5, 2012

Related U.S. Application Data

(63) Continuation-in-part of application No. 13/032,119, filed on Feb. 22, 2011.

(60) Provisional application No. 61/388,881, filed on Oct. 1, 2010, provisional application No. 61/412,212, filed on Nov. 10, 2010.

(51) Int. Cl.
    *F25B 1/00* (2006.01)
(52) U.S. Cl.
    USPC .............................................. 62/115; 62/498
(58) Field of Classification Search
    CPC ........ F03G 7/05; F25B 41/062; F25B 49/022; F25B 1/00; F25B 1/10; F25B 9/008
    USPC ........ 62/498, 434, 181, 183, 185; 165/41, 47; 29/428
    See application file for complete search history.

(56) References Cited

U.S. PATENT DOCUMENTS

| | | | | |
|---|---|---|---|---|
| 4,922,724 | A | * | 5/1990 | Grayson et al. ................. 62/135 |
| 5,094,640 | A | * | 3/1992 | Burdick et al. ............. 440/89 R |
| 5,584,185 | A | * | 12/1996 | Rumble et al. .................. 62/115 |
| 6,263,689 | B1 | * | 7/2001 | Dodge et al. ..................... 62/240 |
| 6,394,014 | B1 | * | 5/2002 | Waldock ...................... 114/61.1 |
| 6,701,733 | B2 | * | 3/2004 | Brunner .......................... 62/240 |
| 7,005,756 | B2 | * | 2/2006 | Westerbeke, Jr. ............. 290/1 A |
| 7,408,273 | B2 | * | 8/2008 | Slocum ........................... 307/80 |
| 7,985,382 | B1 | * | 7/2011 | Henry et al. .................. 422/291 |
| 8,043,132 | B1 | * | 10/2011 | Wyant .............................. 440/1 |
| 8,043,136 | B2 | * | 10/2011 | Sipila et al. .................. 440/88 F |
| 8,535,127 | B2 | * | 9/2013 | Malott .......................... 454/292 |
| 2002/0017108 | A1 | * | 2/2002 | Schooley ........................ 62/240 |

* cited by examiner

*Primary Examiner* — Mohammad M Ali
(74) *Attorney, Agent, or Firm* — Kaplan Breyer Schwarz & Ottesen, LLP (57) ABSTRACT

A pontoon that includes infrastructure for fluidically coupling a heat exchanger or heat exchanger module into each of the seawater and working-fluid distribution systems of an OTEC power generation system is provided. In some embodiments, a pontoon comprises: (1) a first passage for conveying seawater between a first port and a second port at which a heat exchanger module can be connected; and (2) a conduit and connectors for connecting the heat exchanger module and the working fluid circulation system—even while the heat exchanger module is submerged. In some embodiments, pontoons in accordance with the present invention enable heat exchangers or heat exchanger modules to be added or removed to an OTEC system without disrupting the operation of other heat exchangers or heat exchanger modules in use in the OTEC system.

27 Claims, 7 Drawing Sheets

HEAT-EXCHANGE APPARATUS WITH PONTOON-BASED FLUID DISTRIBUTION SYSTEM

CROSS REFERENCE TO RELATED APPLICATIONS

This case is a continuation-in-part of co-pending U.S. patent application Ser. No. 13/032,119, filed Feb. 22, 2011, which is incorporated by reference herein.

This case also claims priority to the following cases, each of which is incorporated by reference:

(1) U.S. Provisional Patent Application 61/388,881, filed Oct. 1, 2010; and (2) U.S. Provisional Patent Application 61/412,212, filed Nov. 10, 2010.

If there are any contradictions or inconsistencies in language between this application and one or more of the cases that have been incorporated by reference that might affect the interpretation of the claims in this case, the claims in this case should be interpreted to be consistent with the language in this case.

FIELD OF THE INVENTION

The present invention relates to heat exchangers in general, and, more particularly, to heat exchangers for ocean thermal energy conversion (OTEC) systems.

BACKGROUND OF THE INVENTION

An Ocean Thermal Energy Conversion (OTEC) system generates electrical energy based on a naturally occurring temperature difference between water at the surface of a large body of water and water thousands of meters deep. As long as the temperature between the warm surface water and the cold deep water differs by about 20° C., an OTEC system can produce a significant amount of power. Oceans (and other large bodies of water, such as seas, large lakes, etc.), therefore, represent vast renewable energy resources, which can be relatively easy to access.

Conventional OTEC systems are typically located far offshore on an offshore platform, such as a tension-leg platform, semi-submersible, spar, drill ship, jack-up offshore platform, grazing plant, and the like. An OTEC electrical generation system normally generates electrical energy by driving a turbogenerator with a working fluid, such as ammonia, that circulates through the OTEC system in a closed loop that includes the turbogenerator, an evaporator, and a condenser.

In operation, heat from warm seawater taken from the surface of the ocean is absorbed by liquid working fluid at the evaporator causing the working fluid to vaporize and expand. The expanding vapor is forced through the turbogenerator, which, in turn, generates electrical energy. After passing through the turbogenerator, the working fluid enters the condenser where its heat is absorbed by cold seawater pumped from a deep-water region of the ocean. As a result, the vaporized working fluid to return to its liquid form. The liquefied working fluid is then pumped back to the evaporator to being the cycle anew.

The evaporator and condenser include suitable configured heat exchangers, at which heat is transferred between the working fluid and seawater. These heat exchangers must be able to withstand prolonged exposure to relatively corrosive working fluid, as well as a large secondary flow of the seawater. In addition, it is preferable, if not required, that such heat exchangers provide high overall heat transfer coefficients, exhibit minimal mechanical pumping losses, and are lightweight. Further, the heat exchangers represent a significant portion of the overall OTEC system cost; therefore, it is important that their materials and fabrication costs are not excessive.

In a typical OTEC configuration, the evaporator and condenser heat exchangers are located on the deck of the offshore platform so they are readily accessible for service and maintenance. Recently, however, OTEC systems have been developed wherein the heat exchangers are located underwater, mounted to the platform support structure. This can, among other things, reduce platform cost, preserve deck space, increase system efficiency, and reduce the complexity of the flow system necessary to bring seawater into and out of the heat exchangers.

Unfortunately, OTEC heat exchangers are highly susceptible to biofouling, corrosion, and degradation over the operating lifetime of their system—particularly when mounted in a submerged location. It is vital, therefore, that they are accessible for regular maintenance, emergency repair, and/or replacement. In some cases, submerged heat exchangers are housed in underwater compartments located within (or attached to) the platform support structure itself. This provides some of the benefits of heat exchanger submersion but also keeps them relatively available for service. Unfortunately, these submerged compartments can add significant cost, size, and complexity to the offshore platform.

In addition, it is sometimes necessary to upgrade the capability of an OTEC system by, for example, adding or upgrading one or more heat exchangers to increase heat-transfer capacity, etc. Preferably, the OTEC system should be capable of continuous operation during maintenance and upgrade procedures. Removal and/or attachment of a submerged heat exchanger can be extremely challenging, however—especially in cases when such operations require personnel to gain access to underwater compartments and/or require special diver operations. As a result, it is often necessary to shut down the entire OTEC system during maintenance, repair, and upgrade operations, which can significantly impact overall production capability.

SUMMARY OF THE INVENTION

The present invention enables OTEC systems that overcome some of the limitations and drawbacks of the prior art. Embodiments of the present invention comprise feeder pontoons that can be located underwater and mounted to an offshore platform. The feeder pontoons include infrastructure that enables them to be integrated into the fluid distribution system that channels seawater through heat exchanger modules that compose the evaporator and condenser of an OTEC system.

An illustrative embodiment of the present invention comprises an offshore platform having a hull comprising a plurality of buoyant caissons and a plurality of pontoons. The pontoons include a plurality of feeder pontoons, which are oriented horizontally and mounted to the offshore platform below the water line. Each feeder pontoon includes a conduit, a first port, and a plurality of second ports, wherein the conduit enables the flow of seawater between the first port and each of the second ports. The feeder pontoons are integrated into the seawater distribution systems to distribute seawater to heat exchanger modules, each containing one or more heat exchangers. The evaporator and condenser of the OTEC system each comprise one or more heat exchanger module. The feeder pontoons are fluidically coupled to regions of the ocean via pumps and conduits located in the caissons, as well as conduits contained within tension legs that anchor the platform hull to the seabed.

The conduits of the feeder pontoons are substantially large chambers that serve as seawater plenums for the heat exchanger modules, wherein a first pontoon serves as a seawater source and a second pontoon serves as a seawater sink. The conduits and ports are designed to mitigate pressure drops, which are typically associated with prior-art OTEC systems. In some embodiments, the passage and ports are designed to smoothly interface with the conduits and/or heat exchanger interfaces with which they are coupled. This is accomplished by, for example, matching the size and shape of the ports of the feeder pontoons to the size and shape of the conduits and heat exchanger interfaces. Further, the conduits of the feeder pontoons are designed to avoid discontinuities, choke points, and other flow restrictions that can give rise to pressure drops, backpressure, or eddy currents in the seawater flow.

By including seawater routing functionality in the feeder pontoons, the present invention obviates the use of multiple pipes for routing seawater to and from the heat exchangers as well as reducing the number of geometric discontinuities at conduit interfaces (e.g., transitions from square to circular cross-sections, etc.). As a result, hydraulic losses normally associated with prior-art OTEC systems are reduced. In addition, the overall reliability of the OTEC system is improved.

In some embodiments, a feeder pontoon also includes working-fluid lines, blind-mate connectors, and valves, which enables the feeder pontoon to integrate directly into the working-fluid circulation system of the OTEC system. As a heat exchanger module is mechanically coupled between two feeder pontoons, the blind-mate connectors establish fluidic connectivity between the working-fluid lines on the feeder pontoons and working-fluid manifolds on the heat exchanger modules. As a result, the heat exchangers of the heat exchanger module can be integrated into the working-fluid circulation system of the OTEC system with little or no effort on the part of service personnel.

Remotely actuatable valves control the flow of the seawater and working fluid through the heat exchanger modules; therefore, each heat exchanger module can be independently removed from the OTEC system without significantly disrupting operation of other heat exchangers in the OTEC system.

In some embodiments, each feeder pontoon comprises at least two pontoon sections that are fluidically independent of one another. Each pontoon section enables a different flow of seawater. In some embodiments, a heat exchanger is mounted directly on top of or below such a pontoon such that seawater flows from a first pontoon section through the heat exchanger and into the second pontoon section.

An embodiment of the present invention comprises an apparatus comprising: a pontoon that is dimensioned and arranged to mechanically coupled with an offshore platform, wherein the pontoon comprises; a first port, a second port, and a first conduit that fluidically couples the first port and the second port.

DETAILED DESCRIPTION

Figure 1:
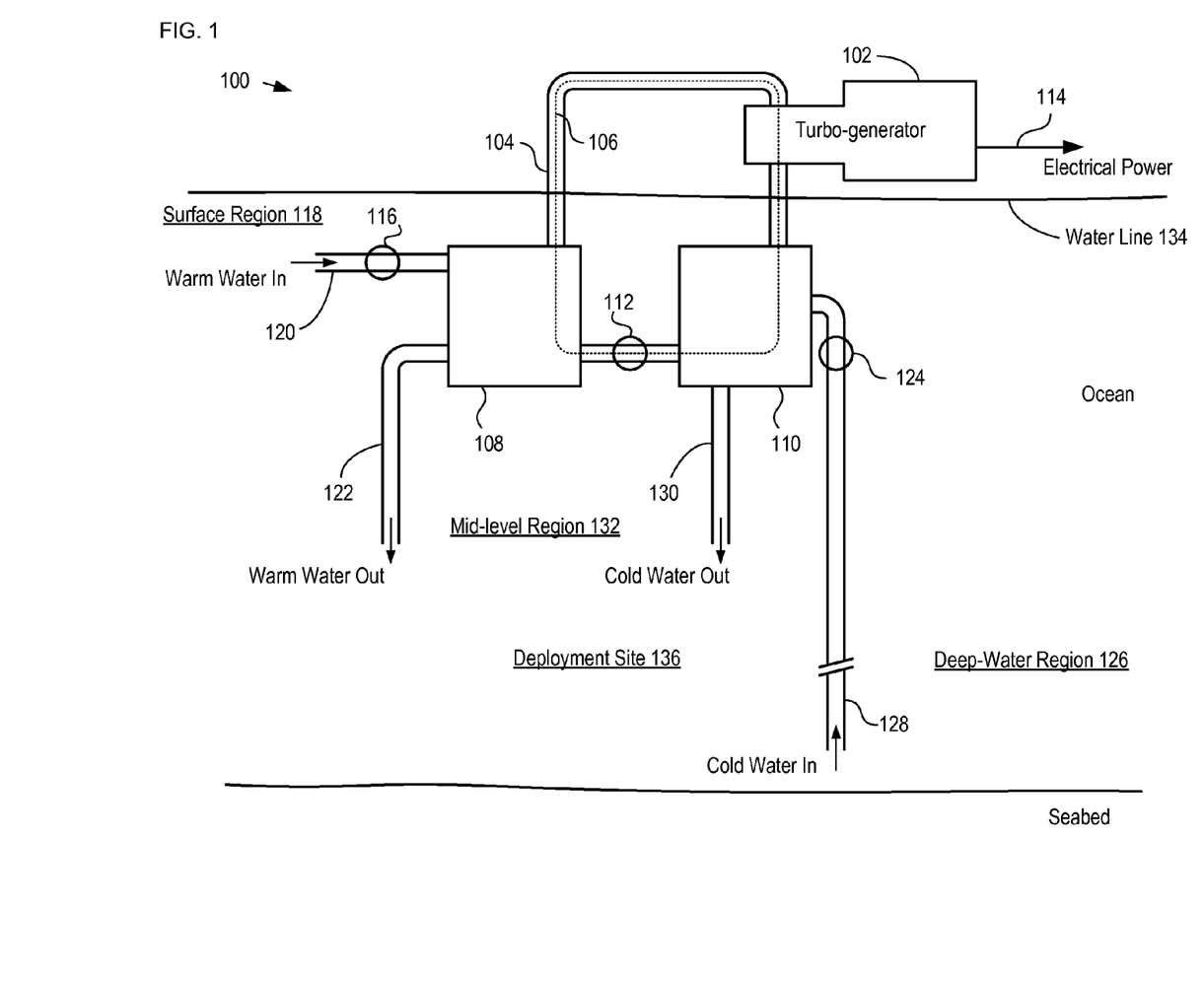
FIG. 1 depicts a schematic diagram of an OTEC power generation system in accordance with an illustrative embodiment of the present invention.

FIG. 1 depicts a schematic diagram of an OTEC power generation system in accordance with an illustrative embodiment of the present invention. OTEC system 100 comprises turbogenerator 102, conduit 104, evaporator 108, and condenser 110.

OTEC system 100 is located at deployment site 136, which is a location in an ocean where the water depth is greater than 1000 meters. In some embodiments, OTEC system 100 is deployed in a body of water other than an ocean (e.g., a lake, sea, etc.).

Collectively, turbogenerator 102, conduit 104, evaporator 108, and condenser 110 form a Rankine-cycle heat engine that generates electrical energy based on the difference in the temperature of water in surface region 118 and the temperature of water in deep-water region 126.

Turbogenerator 102 is a conventional turbine-driven generator supported above water line 134 by an offshore platform. Turbogenerator 102 generates electrical energy and provides it on output cable 114.

Conduit 104 is a conduit for circulating working fluid 106 (typically ammonia) through the heat engine.

Evaporator 108 comprises a plurality of heat exchanger modules that are configured to induce evaporation of working fluid 106.

In operation, pump 112 pumps working fluid 106, in liquid form, through conduit 104 to evaporator 108. Ammonia is often used as working fluid 106 in OTEC systems; however, it will be clear to one skilled in the art that any fluid that evaporates at the temperature of the water in surface region 118 and condenses at the temperature of the water in deep water region 126 is suitable for use as working fluid 106 (subject to material compatibility constraints).

Pump 116 draws warm seawater from surface region 118 into evaporator 108 via conduit 120. In some embodiments, pump 116 is located on the effluent side of evaporator 108 (i.e., pump 116 is fluidically coupled with conduit 122). In a typical OTEC deployment, the water in surface region 118 is at a substantially constant temperature of approximately 25 degrees centigrade (subject to weather and sunlight conditions). At evaporator 108, heat from the warm water is transferred to working fluid 106. Its increased temperature induces working fluid 106 to vaporize and expand. After passing through evaporator 108, the now slightly cooler seawater is ejected back into mid-level region 132 via conduit 122. Mid-level region 132 is typically at a depth of approximately 80-120 meters to avoid decreasing the average water temperature in the surface-water region.

The expansion of vaporized working fluid 106 forces the working fluid through turbogenerator 102, which drives the turbogenerator to generate electrical energy. The generated electrical energy is provided on output cable 114. The hot working fluid vapor passes through turbogenerator 102 and enters condenser 110.

Condenser 110 comprises a plurality of heat exchanger modules that are configured to induce condensation of working fluid 106 from vapor phase to liquid phase.

Cold seawater is drawn into condenser 110 by pump 124 from deep-water region 126 via conduit 128. In some embodiments, pump 124 is located on the effluent side of condenser 110 (i.e., pump 124 is fluidically coupled with conduit 130). Typically deep-water region 126 is at a depth of approximately 1000 meters, where water temperature remains relatively constant at a few degrees centigrade. At condenser 110, the cold water absorbs heat from the vaporized working fluid. As a result, the working fluid cools and condenses back into liquid form.

After passing through condenser 110, the now slightly warmer seawater is ejected into mid-level region 132 of the ocean via conduit 130 to avoid increasing the average water temperature in the deep-water region or decreasing the average water temperature in surface region 118.

Pump 112 then pumps the re-condensed working fluid 106 back to evaporator 108 where it is vaporized again to continue the Rankine cycle used to drive turbogenerator 102.

Figure 2:
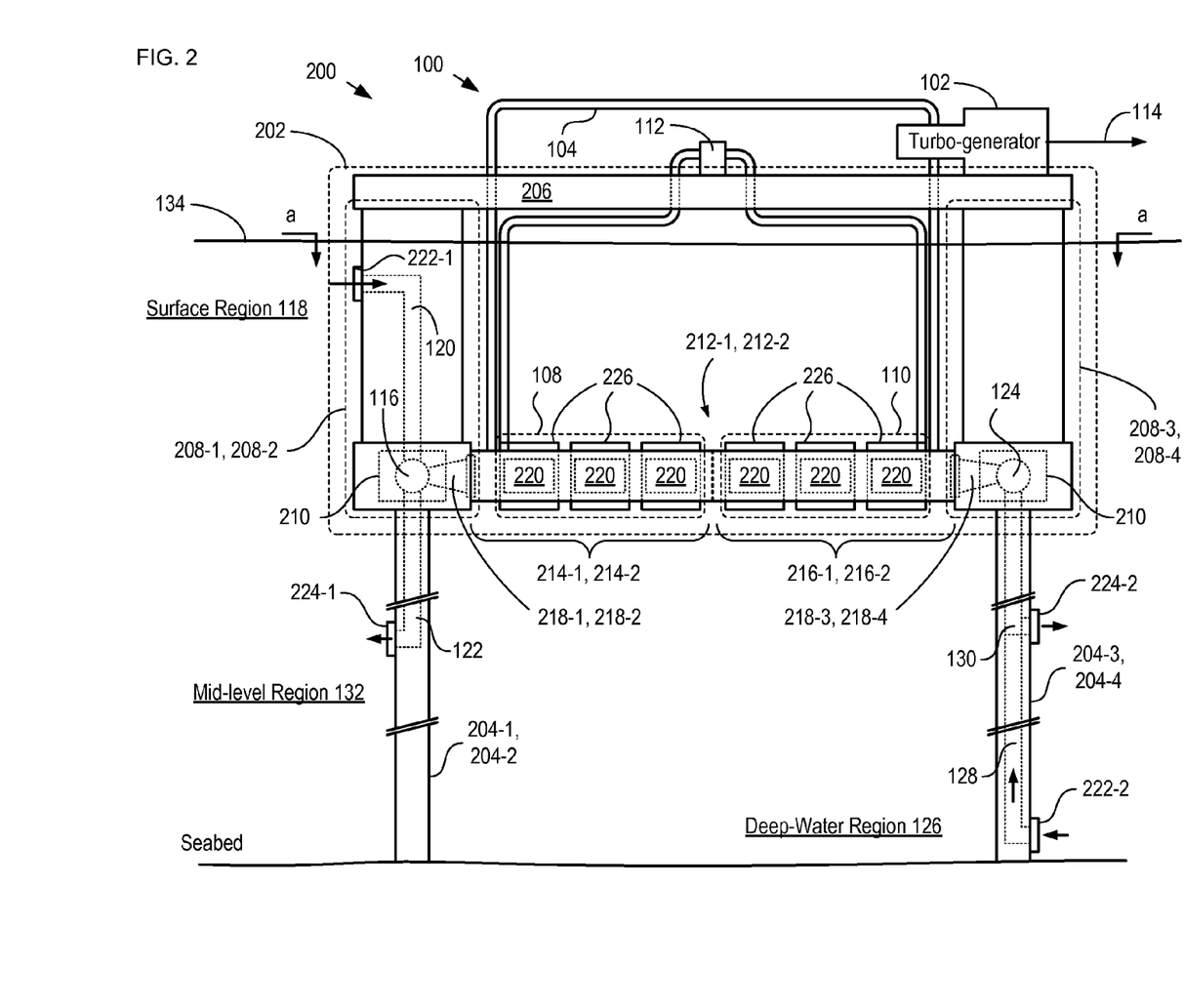
FIG. 2 depicts a schematic diagram of a side-view of an OTEC installation in accordance with the illustrative embodiment of the present invention.

FIG. 2 depicts a schematic diagram of a side-view of an OTEC installation in accordance with the illustrative embodiment of the present invention. Installation 200 comprises OTEC power generation system 100, which is deployed on a tension-leg platform that includes hull 202 and tension legs 204-1 through 204-4. In some embodiments, system 100 is deployed on an offshore platform other than a tension-leg platform, such as a semi-submersible, spar, drill ship, jack-up offshore platform, grazing plant, and the like.

Figure 3:
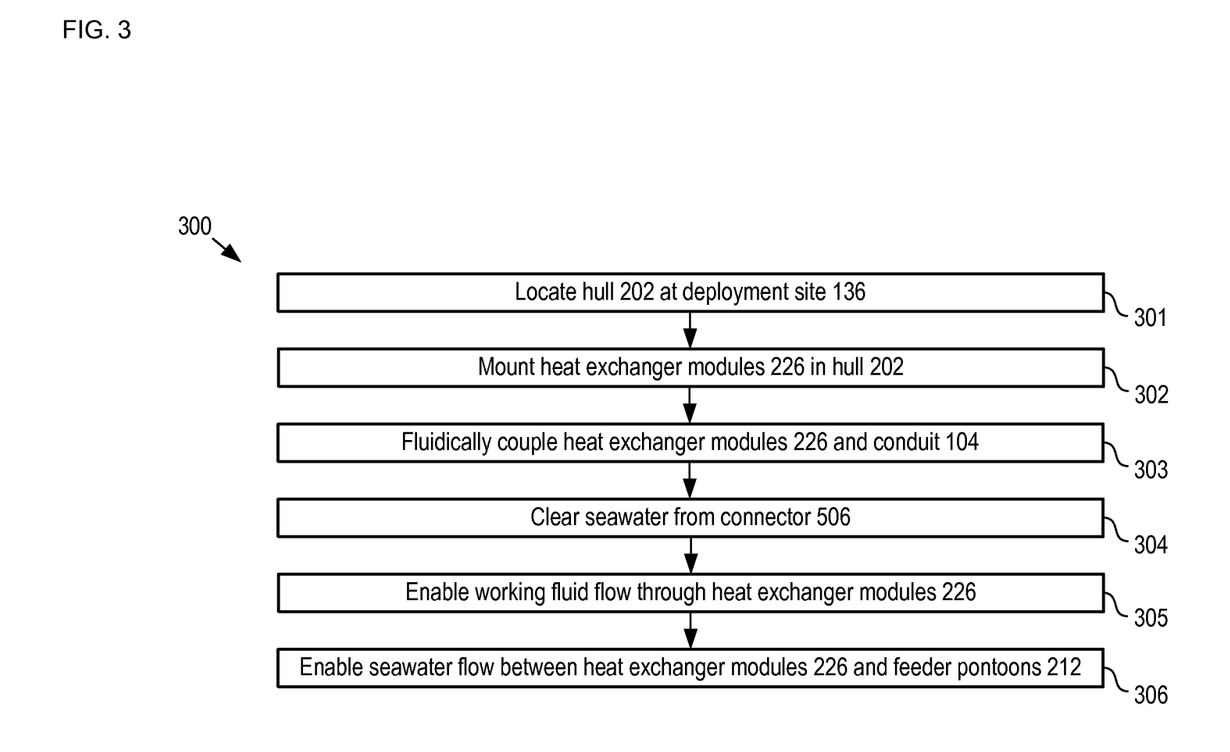
FIG. 3 depicts operations of a method suitable for deploying an OTEC generation system in accordance with the illustrative embodiment.

FIG. 3 depicts operations of a method suitable for deploying an OTEC generation system in accordance with the illustrative embodiment. Method 300 begins with operation 301, wherein hull 202 is located at deployment site 136.

Hull 202 comprises deck 206, caissons 208-1 through 208-4, float pontoons 210, and feeder pontoons 212-1 and 212-2. Hull 202 is typically partially buoyant.

Tension legs 204-1 through 204-4 (referred to, collectively, as tension legs 204) are rigid support members that are anchored to the seabed at deployment site 136 to support hull 202 above water line 134. Each of tension legs 204 comprises one of conduits 122, 124, 128, and 130. In some embodiments, one or more of tension legs 204 does not contain a seawater conduit.

Deck 206 is a platform suitable for supporting, among other things, turbogenerator 102, energy storage systems, operational personnel, and living quarters above the surface of the ocean. Deck 206 is maintained above water line 134, in part, by the collective buoyancy of caissons 208-1 through 208-4, float pontoons 210 and feeder pontoons 212-1 and 212-2. Turbogenerator 102 and pump 112 are located on deck 206. Conduit 104 is routed from deck 206 to feeder pontoons 212-1 and 212-2 along caissons 208-1 through 208-4 (referred to, collectively, as caissons 208). In some embodiments, one or more of caissons 208 encloses a portion of conduit 104.

Each of caissons 208 is a vertical floating support having a buoyancy and water plane area suitable for supporting deck 206 above the ocean surface. Caissons 208 also comprise infrastructure for enabling the flow of seawater through OTEC system 100.

Caissons 208-1 through 208-4 include ports 218-1 through 218-4 (referred to, collectively, as ports 218), respectively. Each of ports 218 comprises a passage for channeling seawater and a valve for enabling or disabling the seawater flow through the port.

Float pontoons 210 are conventional, horizontally oriented pontoons typically used to provide buoyancy and/or ballasting to an offshore platform. Float pontoons 210 augment the buoyancy of caissons 208. In some embodiments, the buoyancy of one or more of float pontoons 210 is controllable.

Feeder pontoons 212-1 and 212-2 (referred to, collectively, as feeder pontoons 212) are horizontally oriented pontoons that comprise infrastructure for conveying seawater to/from evaporator 108 and condenser 110. Feeder pontoon 212-1 is mounted between caissons 208-1 and 208-3 and fluidically coupled with the caissons via ports 218-1 and 218-3. Feeder pontoon 212-2 is mounted between caissons 208-2 and 208-4 and fluidically coupled with the caissons via ports 218-2 and 218-4. In some embodiments, the buoyancy of one or more of feeder pontoons 212 is controllable.

It is an aspect of the present invention that feeder pontoons 212-1 and 212-2 (referred to, collectively, as feeder pontoons 212) provide capability beyond simply adding buoyancy to an offshore platform. While they do augment the buoyancy of hull 202, feeder pontoons 212 also include infrastructure for channeling seawater to and from evaporator 108 and condenser 108. Further, in some embodiments, feeder pontoons also include infrastructure for conveying working fluid to and from evaporator 108 and condenser 108. As a result, feeder pontoons 212 can be integrated into each of the seawater flow system and the working-fluid circulation system of an OTEC system.

This affords embodiments of the present invention with several significant advantages over the prior art. The use of feeder pontoons can reduce the expense and complexity of the conduit systems normally used to channel seawater through an OTEC system. It also enables improved reliability by eliminating seawater conduits that would otherwise be subject to damage from storms, rogue waves, and high currents. The use of feeder pontoons that include working fluid conduits and blind-mate connectors for mating with heat exchanger modules, heat exchanger modules can more easily be removed or added (e.g., for service, replacement, upgrade, etc.) at depth and without disrupting operation of other heat exchanger modules integrated into the OTEC system. As a result, OTEC systems in accordance with the present invention can have significantly lower installation and operation costs as well as improved reliability.

Figure 4A:
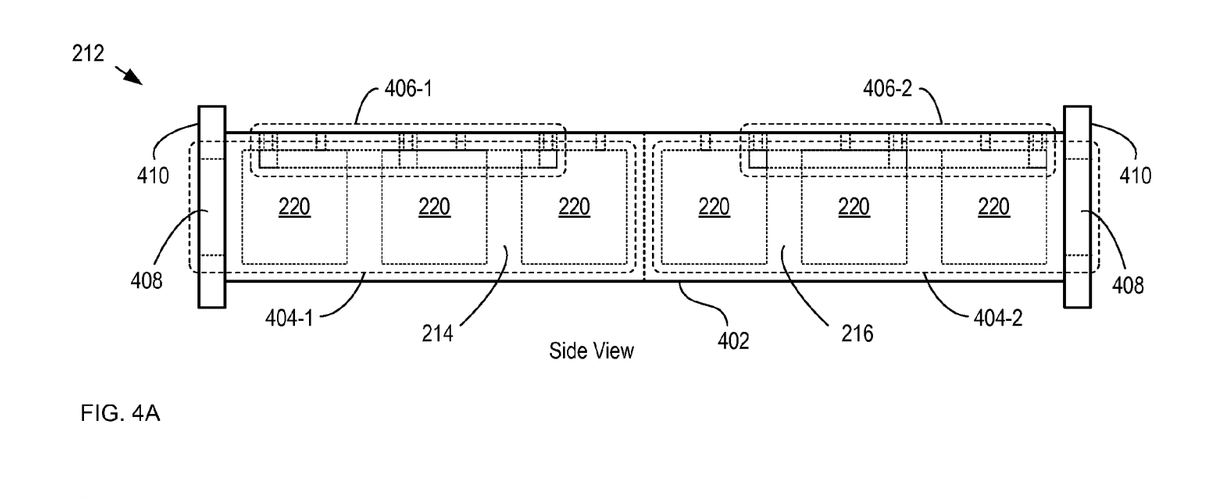
FIGS. 4A and 4B depict schematic drawings of side and top views, respectively, of a feeder pontoon 212 in accordance with the illustrative embodiment of the present invention.
Figure 4B:
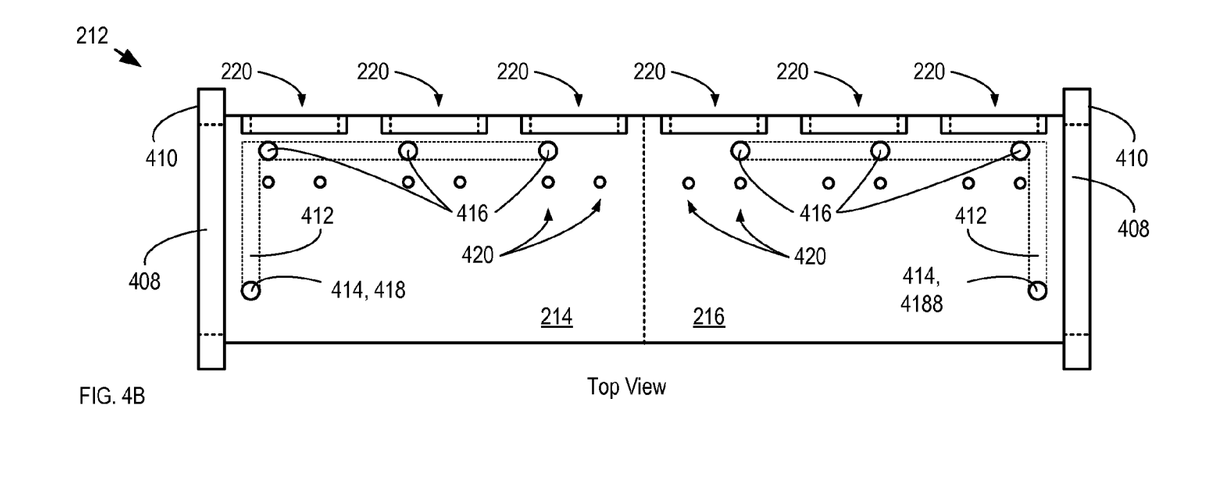

FIGS. 4A and 4B depict schematic drawings of side and top views, respectively, of a feeder pontoon 212 in accordance with the illustrative embodiment of the present invention. Feeder pontoon 212 is representative of either of feeder pontoons 212-1 and 212-2. Feeder pontoon 212 comprises housing 402, seawater distribution systems 404-1 and 404-2, working-fluid distribution systems 406-1 and 406-2, and receivers 420.

Housing 402 is a conventional pontoon housing comprising materials suitable for prolonged exposure to seawater. In some embodiments, housing 402 comprises reinforcing ribs and/or interior bulkheads. In some embodiments, housing 402 comprises material that has positive buoyancy in seawater. It will be clear to one skilled in the art, after reading this specification, how to specify, make, and use housing 402.

Housing 402 is divided into sections 214 and 216, which are thermally insulated to mitigate thermal transfer between each other and between the chambers and the seawater that surrounds housing 402. This enables feeder pontoon 212-1 to provide warm seawater to evaporator 108 while independently providing cold seawater to condenser 110. It also enables feeder pontoon 212-2 to receive warm seawater from evaporator 108 while independently receiving cold seawater from condenser 110.

In some embodiments, feeder pontoons 212 are not sectioned into fluidically decoupled pontoon sections. In such embodiments, evaporator 108 and condenser 110 are fluidically coupled to different pontoons. In some embodiments, a heat exchanger module is fluidically coupled between the pontoon sections of the same pontoon.

Seawater distribution system 404-1 includes section 214, port 408, and three ports 220. Seawater distribution system 404-2 includes section 216, port 408, and three ports 220. Each of sections 214 and 216 is dimensioned and arranged to convey seawater between port 408 and ports 220 without giving rise to significant backpressure or pressure drops. In some embodiments, each of sections 214 and 216 has a cross-section that is substantially discontinuity-free. In addition, port 408 includes an aperture that substantially matches the opening in port 218, thereby giving rise to little or no impedance to seawater flow. In some embodiments, sections 214 and 216 comprise a shape that substantially equalizes the pressure and flow of seawater at each port 220.

Each of ports 408 includes connector 410. Connector 410 is a weldable connector that enables feeder pontoons 212 to be fixedly attached to caissons 208. In some embodiments, connectors 410 enable pontoons 212 to be attached to caissons 208 via an attachment other than a weld joint, such as a brazed joint, rivets, and the like.

Each of ports 220 includes a remotely controllable valve for controlling the flow of seawater between feeder pontoon 212 and heat exchanger modules. Valves suitable for use in ports 220 include, without limitation, ball valves, rotary valves, sluice gates, iris valves, and the like. The inclusion of valves in each port 220 enables each heat exchanger module in evaporator 108 and condenser 110 to be removed independently of any other heat exchanger module in operation in OTEC system 100. As a result, individual heat exchanger modules can be disconnected from pontoons 212 (to be replaced, repaired, refurbished, or exchanged for a heat exchanger having a different heat transfer capacity) without shutting down OTEC power generation system 100.

It is an aspect of the present invention that, like sections 214 and 216, ports 218 and 220 are designed to mitigate the development of pressure drops in the seawater flow through OTEC system 100. Typically, the ports are dimensioned and arranged to avoid flow restrictions, dead zones, and the like, that could give rise to back pressure, pressure drops, eddy currents, etc.

Each of working-fluid distribution systems 406-1 and 406-2 includes a conduit 412, a connector 414, connectors 416, and a valve 418.

Conduits 412 re conventional fluid conduits for conveying working fluid 106 between connector 414 and connectors 416.

Connector 414 is a conventional undersea fluidic coupling for mating with conduit 104.

Each of connectors 416 is a one side of a blind-mate working-fluid connector suitable for undersea use, as described below, and with respect to FIGS. 6A and 6B.

Valves 418 are conventional, remotely actuated valves that control the flow of working fluid through conduit 412.

At operation 302, heat exchanger modules 500 are mechanically coupled with hull 202.

Figure 5A:
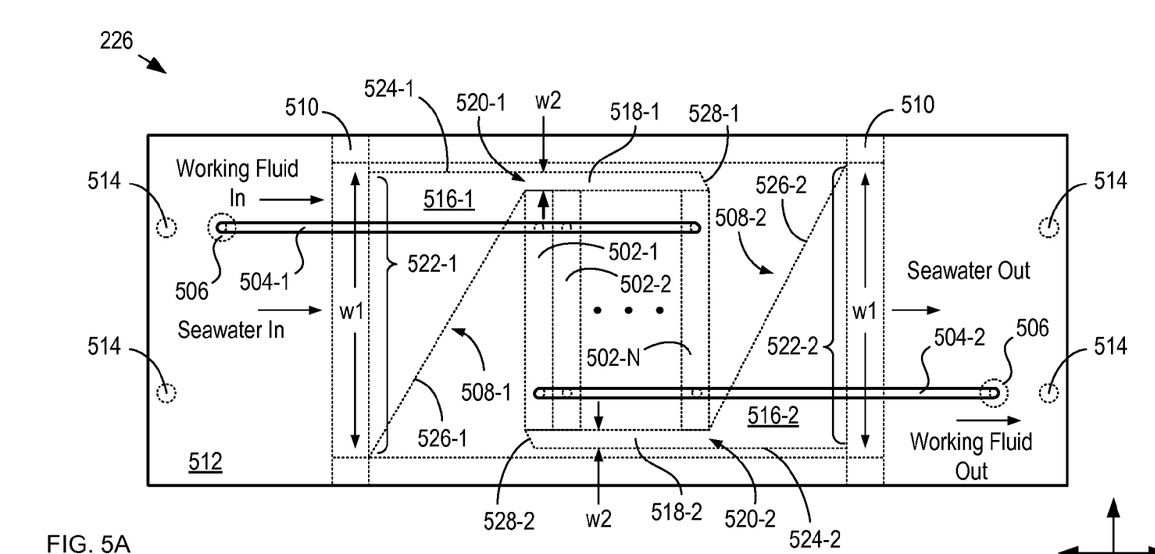
FIGS. 5A and 5B depict schematic drawings of a top view and cross-sectional view of a heat exchanger module in accordance with the illustrative embodiment of the present invention.
Figure 5B:
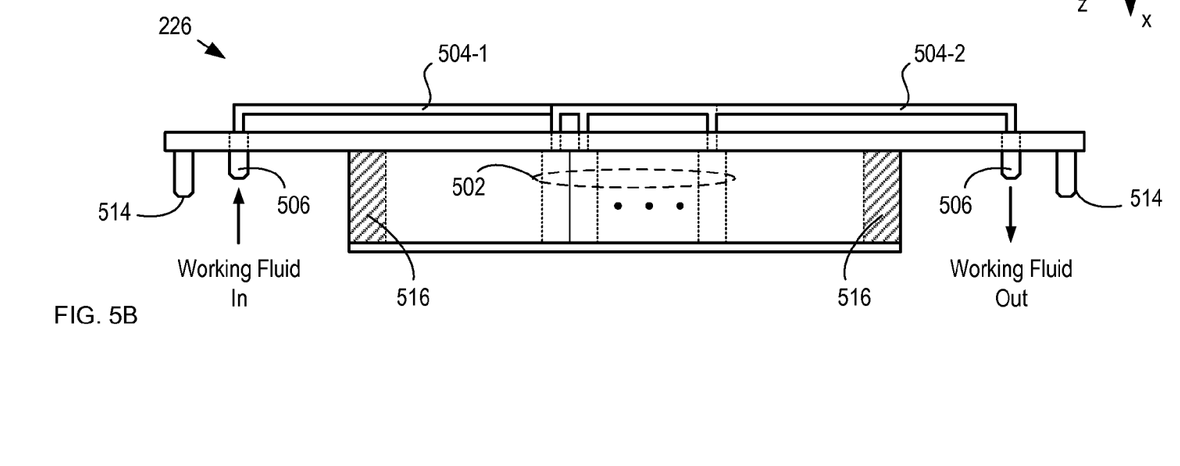

FIGS. 5A and 5B depict schematic drawings of a top view and cross-sectional view of a heat exchanger module in accordance with the illustrative embodiment of the present invention. For clarity, the seawater flow infrastructure of heat exchanger module 226 is not included in FIG. 5B.

Heat exchanger module 226 comprises heat exchangers 502-1 through 502-N, working-fluid manifolds 504-1 and 504-2, connectors 506, seawater manifolds 508-1 and 508-2, gaskets 510, top plate 512, and guide pins 514.

Each of heat exchangers 502-1 through 502-N (referred to, collectively, as heat exchangers 502) is a plate-fin heat exchanger suitable for transferring heat between seawater and working fluid 106. It will be clear to one skilled in the art, after reading this specification, how to specify, make, and use embodiments of the present invention wherein a heat-exchanger module comprises any practical number, N, of heat exchangers.

One skilled in the art will also recognize that the present invention is suitable for use with many types of heat exchangers, such as tube-shell heat exchangers, plate-frame heat exchangers, etc. One skilled in the art will also recognize that, in some applications, certain types of heat exchangers are better suited for operation as evaporators and certain types of heat exchangers are better suited for operation as condensers. In some embodiments of the present invention, therefore, at least one of heat exchangers 502 is a type of heat exchanger other than a plate-fin heat exchanger.

Seawater manifolds 508-1 and 508-2 are substantially identical manifolds for channeling seawater through heat-exchanger module 226. As a result, a generic seawater manifold 508 is described herein as representative of each of seawater manifolds 508-1 and 508-2.

Seawater manifold 508 comprises channels 516 and 518, which are fluidically coupled at interface region 520.

Channel 516 has a substantially uniform height along the z-direction, as indicated. The width of channel 516, however, decreases monotonically along the y-direction from w1 at first end 522 to w2 interface region 520. The cross-sectional area of channel 516, therefore, also decreases monotonically from first end 522 to w2 interface region 520. It should be noted that the cross-sectional area of channel 516 at first end 522 substantially matches the opening of port 220 such that little or no restriction on the flow of seawater between pontoon 212 and channel 516 is introduced at first end 522.

The width of channel 516 along the y-direction is defined by the separation between turning vane 526 and sidewall 524. Turning vane 526 is a substantially straight wall that angles from first end 522 to interface region 520. In some embodiments, turning vane 526 has a shape other than straight, such as curved or irregular. In accordance with the present invention, however, in each embodiment, turning vane 526 introduces no discontinuities or voids into channel 516 that could serve to create pressure drops in the flow of seawater through the channel.

Channel 518 is a channel of substantially uniform width, w2. Channel 518 provides the seawater received at interface region 520 to each of heat exchangers 502. In some embodiments, channel 518 is shaped such that the seawater flow to or from each heat exchanger 502 is substantially equal across the heat exchangers. In some embodiments, channel 518 has a width that is non-uniform.

Channel 518 is terminated by turning vane 528, which facilitates the smooth flow of seawater into or out of heat exchangers 502 without development of significant backpressure.

Seawater pumped into manifold 508-1 is forced through each of heat exchangers 502 via channels 516-1 and 518-1. After it has passed through the heat exchangers the seawater is collected by manifold 508-2 via channels 518-2 and 516-2.

Manifold 508-2 channels the seawater to port 220-2, which enables it to egress to pontoon 212-2. Manifolds 508-1 and 508-2 are dimensioned and arranged to induce little or no pressure drop as seawater flows through the heat exchanger module.

Figure 6A:
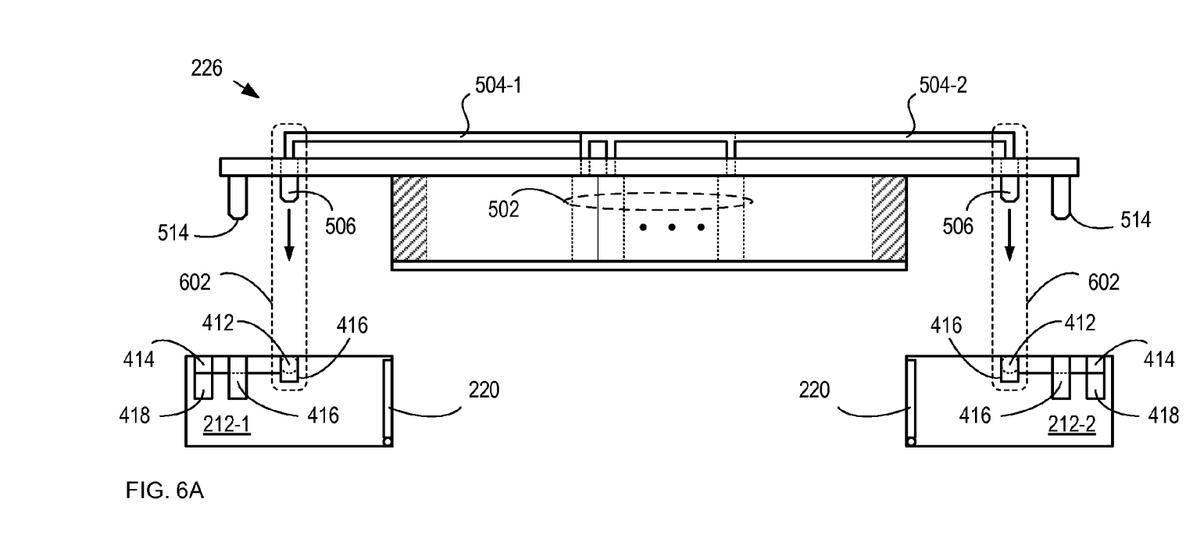
FIGS. 6A and 6B depict schematic drawings of a heat exchanger module, prior to and after engagement with feeder pontoons, respectively, in accordance with the illustrative embodiment of the present invention.
Figure 6B:
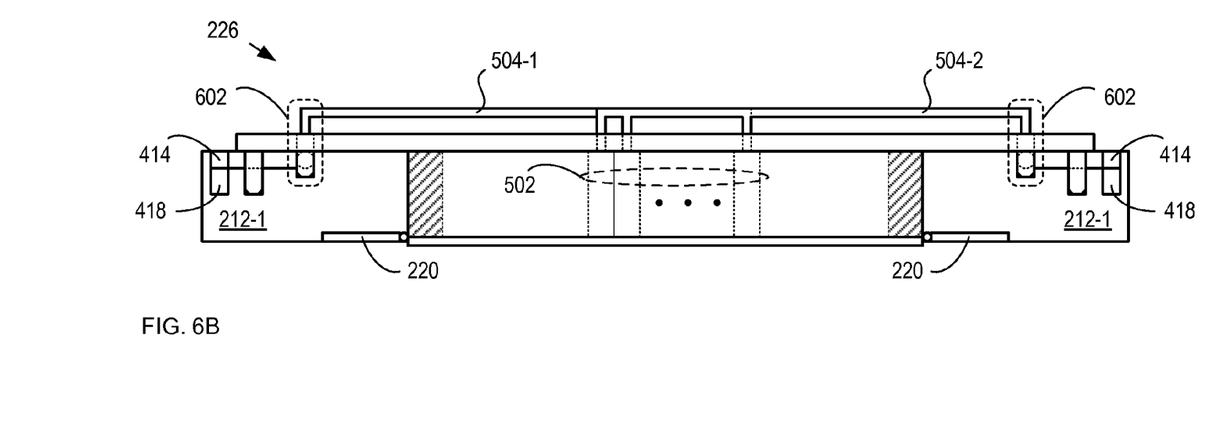

FIGS. 6A and 6B depict schematic drawings of a heat exchanger module, prior to and after engagement with feeder pontoons, respectively, in accordance with the illustrative embodiment of the present invention. FIGS. 6A and 6B are described with continuing reference to FIGS. 4 and 5.

To begin installation of heat exchanger module 226 in hull 202, the module is first roughly aligned with feeder pontoons 212-1 and 212-2. The heat exchanger module is then guided into proper position with the feeder pontoons via guide pins 514 of heat exchanger module 226 and receivers 420 of feeder pontoons 212. Guide pins 514 and receivers 420 represent only one of many guiding structures suitable for putting the heat exchanger module into position with the feeder pontoons. In some embodiments, different guiding structures are used, such as alignment cups and tapered male couplings, hitch and ball assemblies, etc. Once guide pins 514 and receivers 420 are partially engaged, heat exchanger module 226 is firmly locked into position with top plate 512 resting on the top surfaces of feeder pontoons 212 and gaskets 516 aligned with ports 220. In some embodiments, heat exchanger modules are locked in to position using remotely actuatable clamps, or other equivalent mechanical systems (e.g., lag screws, jack clamps, etc.).

At operation 303, heat exchanger modules 226 are fluidically coupled with conduit 104.

The engagement of guide pins 514 and receivers 420 aligns connectors 506 of heat exchanger module 226 with connectors 416 of feeder pontoons 212. Connectors 506 and connectors 416 are mating portions of blind-mate working-fluid connector 602, which fluidically couples working-fluid manifolds 504-1 and 504-2. Connectors 602 establish connection of conduit 412 and working-fluid manifolds 504-1 and 504-2. Connectors 602 enable heat exchanger modules 226 to be fluidically coupled and decoupled with conduit 104 while the heat exchanger modules are under water.

One skilled in the art will recognize that making and breaking working-fluid connections while at operational depth requires addressing several inter-related technical issues, including:
 i. alignment of the connector components during engagement;
 ii. provision of stress relief (mechanical and thermal);
 iii. maintaining physical control of the heat exchanger module; and
 iv. providing leak-free working-fluid connections.

The present invention overcomes or mitigates these issues.

During engagement of connectors 506 and 416, it is possible that seawater can become trapped in connector 602. At operation 304, seawater is cleared from connectors 602.

In some embodiments, a vacuum is drawn on the working fluid line to remove trapped seawater from connector 602. In some embodiments, the working-fluid connections and conduits of a heat exchanger module being installed are pressurized to inhibit seawater infiltration into the working-fluid lines and connectors. In some embodiments, connector 602 comprises a low-point drain line and a high-point flush/vacuum line. Typically, the low-point drain line is located outside working-fluid valve 418 and the high-point flush/vacuum line is located outside a working-fluid valve located on the platform itself. In some embodiments, connector 602 also enables a distilled water flush to avoid inclusion of salt in the working fluid. In some embodiments, a mechanical system (e.g., a lag screw, hydraulic jack, etc.) is included to ensure that connector 602 is firmly connected.

One skilled in the art will recognize, after reading this specification, that additional mechanisms are preferably included in embodiments of the present invention. For example, a flange and gasket are preferably included with connector 506 to ensure a good seal at the connector and avoid leaks into or out of the working fluid system. Typically, the gasket would require significant compression. The gasket should also be available for inspection prior to and after engaging connector 506. In some embodiments, therefore, cameras are included that enable inspection of each connection. Once suitable inspection has been done, the connection can be "locked down" using, for example, a motor and locking ring, latches, slides, etc.

Examples of commercial connectors that have the potential for adaption for use with the present invention include, without limitation, vertical connection systems such as those available from Cameron International Corporation, conventional collet-type flow line connectors, high-angle release jumper connectors, and the like.

In some embodiments, the connections between conduit 104 and heat exchanger modules 226 are made via flexible conduits or hoses that extend from deck 206 to the feeder pontoons at depth. This enables the modules to be brought from their submerged location to the water surface (or deck 206) without making or breaking the working-fluid connections under water.

At operation 305, working fluid 106 is circulated through heat exchangers 502. The flow of working fluid is controlled by working-fluid valves 418. Opening these valves enables the flow of working fluid through heat exchangers 502 via manifolds 504-1 and 504-2. It should be noted that during alignment, however, connector 602 requires lateral and compressive compliance to compensate for minor misalignments.

At operation 306, valves in each of ports 218 and 220 are opened to enable seawater flow through feeder pontoons 212 and heat exchanger module 226.

Ports 220 include remotely actuatable flapper valves that control the flow of seawater into and out of manifolds 518. Although the illustrative embodiment comprises valves that are flapper valves, it will be clear to one skilled in the art, after reading this Specification, how to specify, make, and use alternative embodiments of the present invention wherein at least one of ports 220 comprises a valve other than a flapper valve. Valves suitable for use in embodiments of the present invention include, without limitation, flapper valves, iris valves, ball valves, sluice gates, and the like.

Ports 220 and valves 418 enable each module to be fluidically coupled or decoupled independently from other modules that are operatively engaged with the offshore platform. As a result, the present invention enables:
 i. deployment of an offshore platform whose heat transfer capacity is scalable with demand; or
 ii. reduced downtime for maintenance of an offshore platform; or
 iii. rapid replacement of an impaired module; or
 iv. rapid replacement of a module having a first heat transfer capacity with another module having a second heat transfer capacity; or
 v. any combination of i, ii, iii, and iv.

Figure 7:
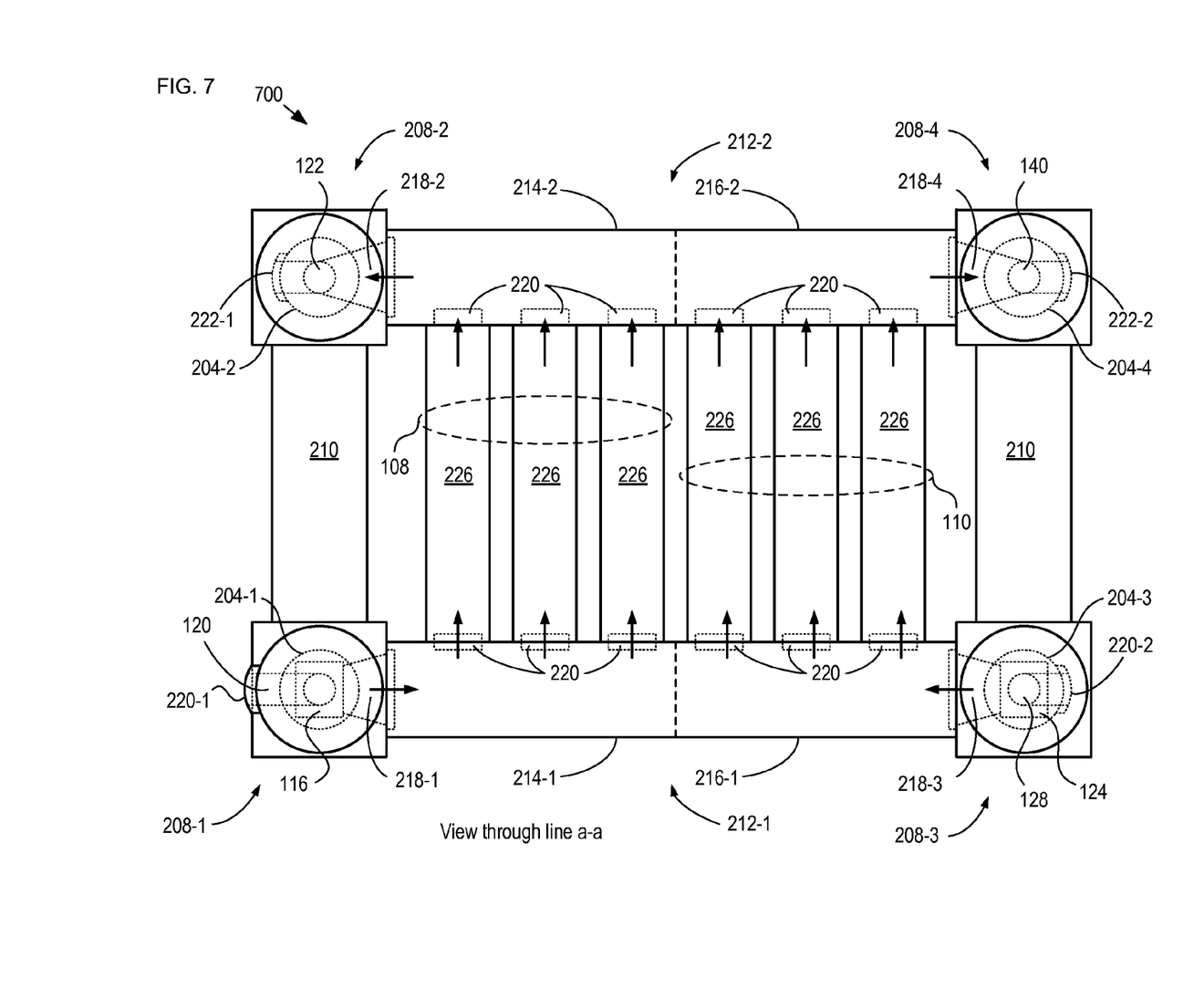
FIG. 7 depicts a schematic diagram of a top-view of a seawater distribution system in accordance with the illustrative embodiment of the present invention.

FIG. 7 depicts a schematic diagram of a top-view of a seawater distribution system in accordance with the illustrative embodiment of the present invention. Seawater distribution system 700 is depicted including evaporator 108 and condenser 110, each of which is shown fully populated with three heat exchanger modules 502. FIG. 7 depicts a view of the seawater distribution system as taken through line a-a of FIG. 2 (without working fluid distribution system of OTEC system 100, for clarity). Seawater distribution system 700 includes conduits 120, 122, 128, and 130, ports 218, feeder pontoons 212, evaporator 108, condenser 110, and pumps 116 and 124.

Seawater distribution system 700 includes two substantially distinct seawater flow paths—one that forces warm seawater through evaporator 108 and one that forces cold seawater through condenser 110.

To circulate warm seawater through evaporator 108, pump 116 draws warm seawater from surface region 118 via inlet 222-1 and conduit 120. Pump 116 is contained within caisson 208-1. Access to the pump for service, etc. is provided through the top of the caisson. In some embodiments, pump 116 is located on deck 206 or at another location, above or below water line 134, on offshore installation 200. In some embodiments, pump 116 is located within pontoon 212-1, which can reduce maintenance complexity by providing easier access to the pumps.

The warm seawater is forced through port 218-1 and enters section 214-1. Section 214-1 operates as a warm seawater source for each of its ports 220 such that heat exchangers 502 of evaporator 108 receive substantially equal flows of seawater at substantially uniform pressure.

After flowing through evaporator 108, the slightly cooler seawater flows and is received by section 214-2 through its ports 220. Section 214-2 operates as a seawater sink for all of the heat exchangers included in evaporator 108. Section 214-2 then provides the slightly cooler seawater to conduit 122 via port 218-2. Section 214-2 is designed with an opening that substantially matches the opening at port 218-2 to mitigate pressure drops, etc. Conduit 122 then ejects the slightly cooler seawater into mid-level region 132 via outlet 224-1.

To circulate cold seawater through condenser 110, pump 124 draws cold seawater from deep-water region 126 via inlet 222-2 and conduit 128. Pump 124 is contained within caisson 208-3, which also provides access to the pump the top of the caisson. In some embodiments, pump 124 is located on deck 206 or at another location, above or below water line 134, on offshore installation 200. In some embodiments, pump 116 is located within pontoon 212-1.

Typically, inlets inlet 222-1 and 222-2 include screens or other filters to mitigate biofouling due to intake of sea animals, vegetation, flotsam, etc.

The cold seawater is forced through port 218-3 and enters section 216-1. Section 216-1 operates as a cold seawater source for each of its ports 220 such that heat exchangers 502 of condenser 110 receive substantially equal flows of seawater at substantially uniform pressure.

After flowing through condenser 110, the slightly warmer seawater is received by section 214-4 through its ports 220. Section 214-4 operates as a seawater sink for all of the heat exchangers included in condenser 110. Section 214-4 then provides the slightly cooler seawater to conduit 122 via port 218-2. Section 214-4 is designed with an opening that substantially matches the opening at port 218-2 to mitigate pressure drops, etc. Conduit 130 then ejects the slightly warmer seawater into mid-level region 132 via outlet 224-2.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. An apparatus comprising:
   a pontoon that is dimensioned and arranged to mechanically coupled with an offshore platform, wherein the pontoon comprises;
   a first port;
   a second port;
   a first conduit that fluidically couples the first port and the second port;
   a caisson, wherein the caisson comprises a second conduit and a third port, and wherein the third port is dimensioned and arranged to fluidically couple to the first port.

2. The apparatus of claim 1 wherein the first port is dimensioned and arranged to mechanically and fluidically couple with a first heat exchanger module that includes a first heat exchanger.

3. The apparatus of claim 2 wherein the second port is dimensioned and arranged to mechanically and fluidically couple with a third conduit.

4. The apparatus of claim 2 wherein the first port comprises a first valve.

5. The apparatus of claim 1 wherein the pontoon is characterized by positive buoyancy when the first conduit is filled with a first fluid.

6. The apparatus of claim 1 further comprising a pump that is dimensioned and arranged to pump the first fluid between the first conduit and the second conduit, wherein the caisson comprises the pump.

7. The apparatus of claim 2 wherein the pontoon further comprises a fourth port that is fluidically coupled with the first conduit, and wherein the fourth port is dimensioned and arranged to mechanically and fluidically couple with a second heat exchanger module that includes a second heat exchanger.

8. The apparatus of claim 1 wherein the pontoon further comprises a fourth port, a fifth port, and a third conduit that fluidically couples the fourth port and fifth port, and wherein the first conduit and third conduit are fluidically decoupled.

9. The apparatus of claim 8 wherein the first port is dimensioned and arranged to mechanically and fluidically couple with a first heat exchanger module that includes a first heat exchanger, and wherein the second port is dimensioned and arranged to mechanically and fluidically couple with a fourth conduit, and wherein the fourth port is dimensioned and arranged to fluidically couple with a second heat exchanger module that includes a second heat exchanger, and further wherein the fifth port is dimensioned and arranged to fluidically couple with a fifth conduit.

10. The apparatus of claim 1 wherein the pontoon further comprises a third conduit and a first-fluid connector that is dimensioned and arranged to fluidically couple the third conduit and a first heat exchanger module that includes a first heat exchanger.

11. The apparatus of claim 10 further comprising the first heat exchanger module, wherein the first-fluid connector comprises a first connector and a second connector, and wherein the first connector and second connector enable the flow of a second fluid between the third conduit and the first heat exchanger module when the first connector and second connector are joined.

12. The apparatus of claim 11 wherein the first-fluid connector is dimensioned and arranged to clear the first fluid from the first-fluid connector.

13. The apparatus of claim 11 further comprising an injector for injecting a second fluid into the first-fluid connector.

14. An apparatus comprising:
a first pontoon that is dimensioned and arranged to mechanically couple to an offshore platform, the first pontoon comprising;
a first port;
a second port;
a first conduit for conveying seawater, the first conduit being fluidically coupled with the first port and second port;
a first connector;
a second connector;
a second conduit for conveying a working fluid, the second conduit being fluidically coupled with the first connector and the second connector; and
a first caisson, wherein the first caisson comprises a third conduit and a third port, wherein the third port is dimensioned and arranged to fluidically couple with the first port.

15. The apparatus of claim 14 wherein the first connector is dimensioned and arranged to clear seawater from the first connector.

16. The apparatus of claim 14 further comprising an injector for injecting a second fluid into the connector.

17. The apparatus of claim 14 further comprising a second pontoon that is dimensioned and arranged to mechanically couple to the offshore platform, the second pontoon comprising a fourth port, a fifth port, and a fourth conduit that is fluidically coupled with the fourth port and fifth port.

18. The apparatus of claim 17 further comprising:
a first heat exchanger module that includes a first heat exchanger, the first heat exchanger module being reversibly attachable to each of the first pontoon and the second pontoon such that the first heat exchanger module is fluidically coupled to each of the first port and fourth port;
wherein the first pontoon receives seawater at the second port and conveys it to the first port; and
wherein the second pontoon receives seawater at the fourth port and conveys it to the fifth port.

19. The apparatus of claim 14 wherein the first pontoon comprises:
a first pontoon section that comprises the first port, second port, and the first conduit; and
a second pontoon section that comprises a fourth port, a fifth port, and a fourth conduit for conveying seawater, the fourth conduit being fluidically coupled with the fourth port and the fifth port;
wherein the first pontoon section and second pontoon section are fluidically decoupled.

20. The apparatus of claim 19 further comprising a second pontoon that is dimensioned and arranged to mechanically couple to the offshore platform, the second pontoon comprising:
a third pontoon section that comprises a sixth port, seventh port, and a fifth conduit that is fluidically coupled with the sixth port and seventh port; and
a fourth pontoon section that comprises an eighth port, a ninth port, and a sixth conduit that is fluidically coupled with the eighth port and ninth port;
wherein the third pontoon section and fourth pontoon section are fluidically decoupled.

21. The apparatus of claim 20 further comprising a second heat exchanger module that includes a second heat exchanger, the second heat exchanger module being dimensioned and arranged to fluidically couple with each of the sixth port and eighth port;
wherein the second pontoon section receives seawater at the fifth port and conveys it to the fourth port;
wherein the second heat exchanger module receives seawater and conveys it to the eighth port; and
wherein the fourth pontoon section receives seawater at the eighth port and conveys it to the ninth port.

22. The apparatus of claim 14 wherein the third port includes a first aperture and the first port includes a second aperture, and wherein each of the first aperture and the second aperture has substantially the same cross-sectional area and shape.

23. The apparatus of claim 14 further comprising a tension leg, wherein the tension leg comprises a fourth conduit that is fluidically coupled with the third port, and wherein the third port is dimensioned and arranged to fluidically couple with the first port.

24. A method comprising:
mechanically coupling a first heat exchanger module and a first pontoon that is submerged and mechanically coupled to an offshore platform, wherein the first heat exchanger module includes a first heat exchanger, and wherein the first pontoon comprises a first port, a second port, and a first conduit for conveying seawater between the first port and the second port;
connecting a first connector to enable flow of a working fluid between the first pontoon and the first heat exchanger module;
enabling the flow of seawater between the first heat exchanger module and the first pontoon; and
clearing seawater from the first connector, wherein seawater is cleared from the first connector based at least in part by pressurizing the first connector with a first gas.

25. The method of claim 24 further comprising:
mechanically coupling the first heat exchanger module and a second pontoon that is submerged and mechanically coupled to the offshore platform, wherein the second pontoon comprises a third port, a fourth port, and a second conduit for conveying seawater between the third port and the fourth port;
connecting a second connector to enable flow of the working fluid between the second pontoon and the first heat exchanger module; and
enabling the flow of seawater between the first heat exchanger module and the second pontoon.

26. The method of claim 24 wherein seawater is also cleared from the first connector by creating a vacuum in the first connector.

27. The method of claim 24 wherein seawater is also cleared from the first connector by flushing the first connector with a first liquid.

* * * * *